No. 718,295. PATENTED JAN. 13, 1903.
J. WILLIAMS & J. BUTLER.
PORTABLE SKID.
APPLICATION FILED NOV. 9, 1901.
NO MODEL.
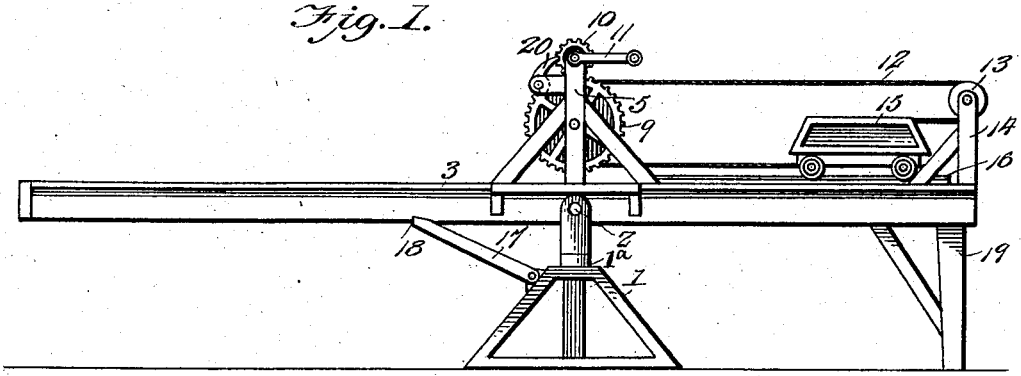
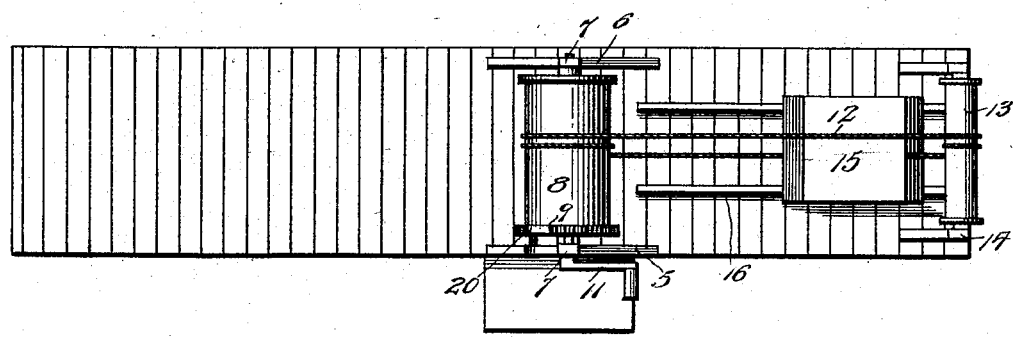
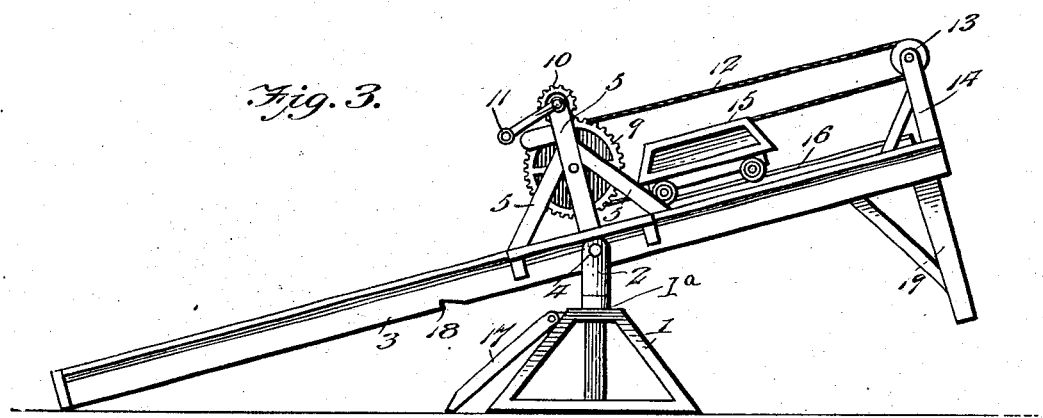

UNITED STATES PATENT OFFICE.

JEFF WILLIAMS AND JOHN BUTLER, OF RUSK, TEXAS.

PORTABLE SKID.

SPECIFICATION forming part of Letters Patent No. 718,295, dated January 13, 1903.

Application filed November 9, 1901. Serial No. 81,709. (No model.)

*To all whom it may concern:*

Be it known that we, JEFF WILLIAMS and JOHN BUTLER, citizens of the United States, residing at Rusk, (Box 103,) in the county of Cherokee and State of Texas, have invented new and useful Improvements in Portable Skids, of which the following is a specification.

This invention relates to a portable skid or platform for loading and unloading, and is particularly adapted for use in cotton-yards and similar places for loading bales onto or from a wagon or car.

The primary object of the invention is to provide a skid or platform which may be conveniently controlled by a single person through the medium of a movable weight equal to or in excess of the weight of the bale or other object.

Other objects, as well as the novel details of construction, will be pointed out hereinafter, illustrated in the accompanying drawings, and defined in the appended claims.

In the drawings, Figure 1 represents a side elevation of a skid or platform constructed in accordance with our invention, showing the platform in a horizontal position. Fig. 2 is a top plan view of the same. Fig. 3 is a side elevation of the invention in a position to receive the bale or other object from the ground prior to elevating the same.

1 designates a suitable base-frame upon which is pivotally mounted a standard 2, supporting a horizontal and laterally-pivoted platform 3, fulcrumed to said standard at 4. The standard fits into the collar or socket 1ᵃ in the top of the frame 1, so that the platform may be swung on a lateral plane. Opposite the fulcrum-point and carried by the platform 3 is a pair of standards 5 and 6, in which is journaled a shaft 7, carrying a winding-drum 8, having a peripheral gear 9 at one end thereof. Immediately above this drum and carried by the standard 5 is a gear-wheel 10, meshing with the gear 9 of the drum 8. The gear 9 is actuated by a suitable crank 11 for the purpose of driving the drum to wind a cord or cable 12, which passes around said drum and also around an idle roller 13, journaled at one end of the platform 3 in suitable bearings 14. The respective ends of the cable 12 are attached to a weighted car 15, traveling on guides or tracks 16, positioned on the platform 3 at one side of the fulcrum-point thereof. The opposite end of the platform is designed to receive bales, boxes, barrels, or similar devices, either when the platform is in a horizontal position or in an inclined position, as shown in Figs. 1 and 3.

If it is desired to raise a weighted article from the ground to a horizontal plane—as, for instance, opposite a wagon-body—the article is rolled or placed upon one end of the platform, the weighted car 12 being conveyed through the medium of the drum and cord near the fulcrum-point thereof. In order to raise the article, the operator turns the crank 11 and conveys the car toward the extreme end of the platform, and the weight of the car will be sufficient to cause the platform to assume a horizontal plane, as shown in Fig. 1, when it may be propped in said position through the medium of a pivoted arm 17, carried by the base-frame 1 and the free end of which is adapted to engage a notch 18 in the lower side of the platform 3. In order to limit the downward movement of the weighted end of the platform, we provide legs or standards 19 thereon, which will only permit the platform to assume a horizontal plane when the weighted car overcomes the weight on the opposite end of said platform.

If it is desired to lower a weighted article from an elevated support to the ground, the weighted car will be conveyed to the end of the platform, and after the article to be lowered is placed upon the opposite end the operator will grind the car toward the fulcrum-point a sufficient distance to balance the said platform, and by moving the car a slight distance farther toward the fulcrum-point the weight of the opposite end will be sufficient to overcome that of the car and the platform will assume an inclined position, as illustrated in Fig. 3.

In order to hold the weight in a predetermined position, we provide a pawl or dog 20 on one of the standards 5 or 6 to engage the gear-wheel 10. It will be noticed that the standard 2 supports the entire structure above the base-frame, and inasmuch as the said standard is pivotally secured to the same said platform may be swung on the arc of a circle through the medium of the handles 21.

From the foregoing it will be seen that we have provided a cheap, durable, and efficient device for performing the service for which this invention is intended and one which may be conveniently operated by a single person.

Having thus fully described our invention, what we claim as new, and desire to secure by Letters Patent, is—

1. In a device of the character described, the combination with a base, a pivoted platform carried by said base, a weighted car on the platform and adapted to travel on one side of the fulcrum-point and means for actuating said car.

2. In a device of the character described, the combination with a base, a pivoted platform carried thereby, a traveling weight on the platform and adapted to travel on one side of the fulcrum-point thereof and a cable and drum for actuating the weight.

3. In a device of the character described, the combination with a base; of a pivoted platform carried thereby, a revoluble drum on the platform intermediate the ends thereof, an idle roller on one end of the platform, a cable wound on the drum and roller, a traveling weight carried by said platform on one side of the fulcrum-point and secured to the cable and means for actuating the drum whereby the weight may be moved toward and away from the fulcrum-point of said platform.

4. In a device of the character described, the combination with a base, a pivoted standard secured thereto, a fulcrumed platform carried by the standard, a drum positioned on the platform and above the fulcrumed point thereof, an idle roller on one end of said platform, a cable wound on the drum and roller, and a movable weight secured to the cable and adapted to be moved toward and away from the fulcrum-point of the platform through the medium of the drum.

In testimony whereof we affix our signatures in presence of two witnesses.

JEFF $\overset{\text{his}}{\times}$ WILLIAMS.
JOHN $\overset{\text{mark.}}{ }$ BUTLER.

Witnesses:
W. P. ARDREY,
JOE WELKERSON.